(12) United States Patent
Bae et al.

(10) Patent No.: US 7,907,235 B2
(45) Date of Patent: Mar. 15, 2011

(54) DUAL LIQUID CRYSTAL DISPLAY (LCD)

(75) Inventors: Kyu-Han Bae, Suwon-si (KR); Shawn Kim, Suwon-si (KR); Do-Young Kim, Suwon-si (KR); David Lee, Suwon-si (KR); Won-Ki Cho, Suwon-si (KR); Hwal Choi, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 254 days.

(21) Appl. No.: 12/222,721

(22) Filed: Aug. 14, 2008

(65) Prior Publication Data

US 2009/0185098 A1 Jul. 23, 2009

(30) Foreign Application Priority Data

Jan. 17, 2008 (KR) .................. 10-2008-0005226

(51) Int. Cl.
G02F 1/133 (2006.01)
(52) U.S. Cl. ........................................... 349/73; 349/61
(58) Field of Classification Search .............. 349/61–71, 349/73
See application file for complete search history.

(56) References Cited

U.S. PATENT DOCUMENTS

| | | | |
|---|---|---|---|
| 2002/0044234 A1* | 4/2002 | Choi | 349/65 |
| 2003/0112217 A1* | 6/2003 | Lee | 345/102 |
| 2003/0198141 A1* | 10/2003 | Brewer et al. | 368/84 |
| 2004/0080686 A1* | 4/2004 | Chuang | 349/113 |
| 2004/0183960 A1* | 9/2004 | Kim et al. | 349/61 |
| 2004/0246412 A1* | 12/2004 | Kim et al. | 349/113 |
| 2006/0001806 A1 | 1/2006 | Uh et al. | |
| 2006/0044828 A1* | 3/2006 | Kim et al. | 362/613 |
| 2006/0250321 A1* | 11/2006 | Park et al. | 345/1.3 |
| 2007/0132896 A1* | 6/2007 | Lee et al. | 349/2 |
| 2008/0030484 A1* | 2/2008 | Cho et al. | 345/176 |

FOREIGN PATENT DOCUMENTS

| | | |
|---|---|---|
| CN | 1527111 A | 9/2004 |
| CN | 1713034 A | 12/2005 |
| JP | 2004-109992 | 4/2004 |
| JP | 2004-145109 A | 5/2004 |
| KR | 20-0388512 | 6/2005 |
| KR | 20-0402149 | 11/2005 |
| KR | 10/2005-0120999 | 12/2005 |
| KR | 10-2006-0010507 A | 2/2006 |
| KR | 10-2007-0079400 | 8/2007 |
| KR | 10-2008-0000762 A | 1/2008 |

OTHER PUBLICATIONS

"The extended European search report" dated Mar. 4, 2009 for Applicant's European Patent Application No. 08171302.6.

(Continued)

*Primary Examiner* — Brian M. Healy
*Assistant Examiner* — Mary A El-Shammaa
(74) *Attorney, Agent, or Firm* — Robert E. Bushnell, Esq.

(57) ABSTRACT

A dual Liquid Crystal Display (LCD), having a transmissive first panel and a reflective second panel, includes: a first LCD panel and a second LCD panel arranged on the same substrate, the first LCD panel displaying an image on a first surface thereof and the second LCD panel displaying an image on a second surface thereof; a backlight unit arranged on a bottom of the first LCD panel; and a housing, anchoring the first and second LCD panels and the backlight unit, and having an opening corresponding to an image-displaying surface of the second LCD panel.

8 Claims, 3 Drawing Sheets

OTHER PUBLICATIONS

Transmitter letter and the Korean Office Action issued by Korean patent office on Jul. 27, 2009 in the corresponding Korean Patent Application No. 10-2008-0005226.

Chinese Office Action issued by the Chinese Patent Office on Nov. 24, 2010 corresponding to Korean Patent Application No. 2008-0005226 and Request for Entry of the Accompanying Office Action attached herewith.

* cited by examiner

DUAL LIQUID CRYSTAL DISPLAY (LCD)

CLAIM OF PRIORITY

This application makes reference to, incorporates the same herein, and claims all benefits accruing under 35 U.S.C. §119 from an application for DUAL LIQUID CRYSTAL DISPLAY DEVICE earlier filed in the Korean Intellectual Property Office on the Jan. 17, 2008 and there duly assigned Ser. No. 10-2008-0005226.

BACKGROUND OF THE INVENTION

1. Field of the Invention

The present invention relates to a Liquid Crystal Display (LCD), and more particularly, the present invention relates to a dual LCD including a transmissive first panel and a reflective second panel.

2. Description of the Related Art

A Liquid Crystal Display (LCD) is a flat panel display having advantages in that it is small, thin and has a low power consumption, and has been used in portable computers, such as notebook PCs, office automation equipment, audio/video equipment, etc.

An LCD displays a picture or an image by controlling an electric field to transmit or cut off the light, the electric field being applied to liquid crystal materials having dielectric anisotropy. An LCD uses external light from the outside without generating light by itself, unlike displays, such as Organic Light Emitting Displays (OLEDs) and Cathode Ray Tubes (CRTs), which generate light by themselves.

In general, LCDs are divided into transmissive and reflective LCDs depending on the manner of employing light.

That is to say, LCDs are divided into transmissive LCDs and reflective LCDs depending on whether they use a separate backlight or reflected external light as a light source. In addition, there has been an attempt to develop a transflective LCD in which the transmissive LCD is combined with the reflective LCD.

Also, a dual LCD displaying a picture on both sides of the LCD has been developed recently. The dual LCD includes a main LCD panel and a sub LCD panel to display a picture on both sides thereof.

However, conventional dual LCDs are provided with a backlight installed in each of the main LCD panels and the sub LCD panels so that the thickness and weight thereof are increased and the power consumption thereof is high.

This runs against the trends of small and thin portable devices, such as mobile phones using LCDs, and therefore LCDs have problems with regard to their slimness and high cost.

SUMMARY OF THE INVENTION

Accordingly, the present invention is designed to solve such drawbacks of the prior art, and it is therefore an object of the present invention is to provide a dual Liquid Crystal Display (LCD) including a transmissive first LCD panel for displaying an image on a first surface and a reflective second LCD panel for displaying an image on a second surface and being able to maximize slimness and cost saving effects by forming the first and second LCD panels on the same substrate.

One embodiment of the present invention is achieved by providing a dual LCD including: a first LCD panel and a second LCD panel formed on the same substrate, the first LCD panel displaying an image on a first surface thereof and the second LCD panel displaying an image on a second surface thereof; a backlight unit arranged on the bottom of the first LCD panel; and a housing anchoring the first and second LCD panels and the backlight unit and having an opening corresponding to an image-displaying surface of the second LCD panel.

The first LCD panel is realized with a transmissive LCD panel, and the second LCD panel is realized with a reflective LCD panel.

Also, the first and second LCD panels are respectively formed in different first and second regions of the first and second substrates forming the same substrate, a thin film transistor array and a transmissive electrode are formed in a region corresponding to the first region of the first substrate, a thin film transistor array and a reflective electrode are formed in a region corresponding to the second region of the first substrate, and a common electrode and a color filter pattern are respectively formed in first and second regions of the second substrate corresponding to the first and second regions of the first substrate.

In addition, a drive circuit unit to drive the first and second LCD panels is mounted on one side of the first substrate arranged outside the first and second regions, and a first polarizing plate and a second polarizing plate are respectively formed on the top and bottom of the first and second LCD panels.

Furthermore, the backlight unit includes: a power source and a light guide plate, arranged on the bottom of the first LCD panel; and an inclined portion formed on one side end of the light guide plate, the one side end of the light guide plate being an end portion of a light guide plate arranged in the remotest position away from the power source.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
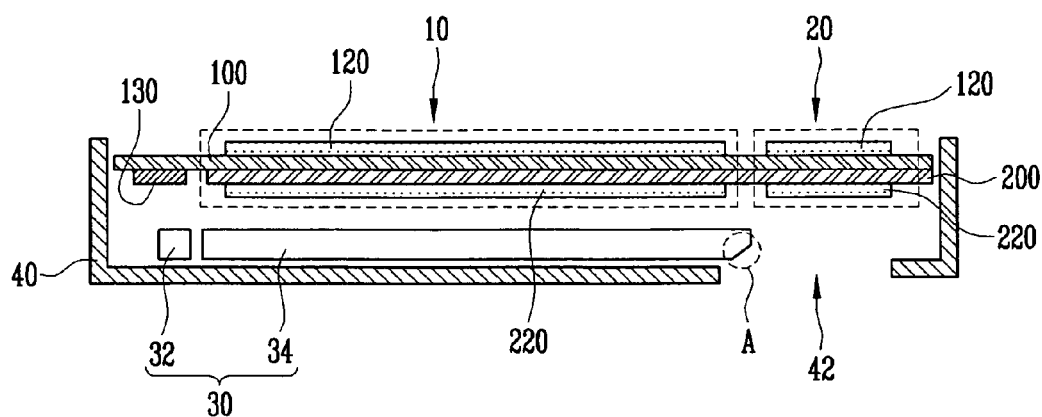
FIG. 1 is a cross-sectional view of a configuration of a dual LCD according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Figure 2:
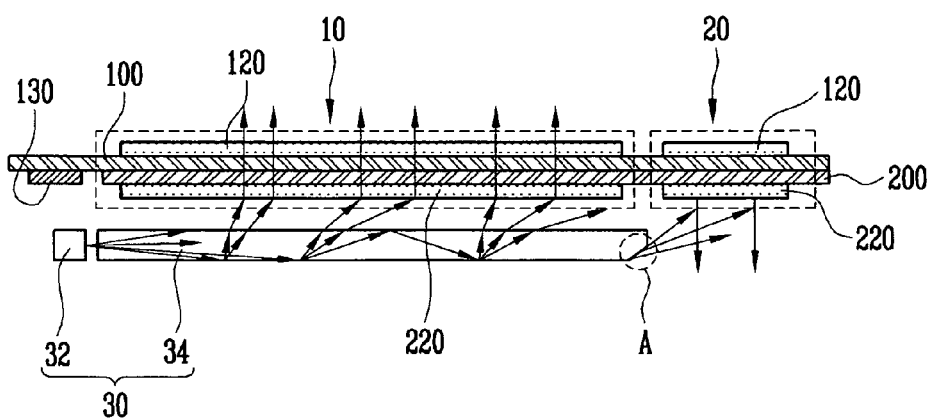
FIG. 2 is a cross-sectional view of the operation of the dual LCD of FIG. 1.

FIG. 1 is a cross-sectional view of a configuration of a dual LCD according to one exemplary embodiment of the present invention and FIG. 2 is a cross-sectional view of the operation of the dual LCD of FIG. 1.

Referring to FIG. 1, the dual LCD 1 according to one exemplary embodiment of the present invention includes a first LCD panel 10, a second LCD panel 20, a backlight unit 30, and a housing 40.

The first and second LCD panels 10 and 20 are formed on the same substrate, the first LCD panel 10 displaying an image on a first surface thereof, and the second LCD panel 20 displaying an image on a second surface thereof.

The first LCD panel 10 is realized with a transmissive LCD panel, and the second LCD panel 20 is realized with a reflective LCD panel.

The first and second LCD panels 10 and 20 are formed using a pair of the same substrates.

More particularly, a Thin Film Transistor (TFT) array (not shown) and a transmissive electrode (not shown) are formed in a region corresponding to a first region of a first substrate 100, and a TFT array (not shown) and a reflective electrode (not shown) are formed on a region corresponding to a second region of the first substrate 100. Also, a common electrode (not shown) and a color filter pattern (not shown) are formed respectively in first and second regions of a second substrate 200 corresponding to the first and second regions of the first substrate 100. A liquid crystal layer (not shown) is formed between the first substrate 100 and the second substrate 200. A first polarizing plate 120 and a second polarizing plate 220 are respectively formed on the top and bottom of the first and second LCD panels 10 and 20.

Therefore, the transmissive first LCD panel 10 is formed in the first regions of the first substrate 100 and the second substrate 200, and the reflective second LCD panel 20 is formed in the second regions of the first substrate 100 and the second substrate 200.

Also, a drive circuit unit 130 for driving the first and second LCD panels 10 and 20 is mounted on one side of the first substrate 100 and is arranged outside of the first LCD panel 10.

The backlight unit 30 includes a power source 32 and a light guide plate 34, as shown in FIG. 1, arranged on the bottom of the first region, e.g., the first LCD panel 10.

Referring to FIG. 2, light generated by the power source 32 passes through a light guide plate 34, and enters a second polarizing plate 220 formed on the bottom of the first LCD panel 10. The first LCD panel 10 operates in a transmissive mode to display an image on an opposite surface, e.g., a first surface, of a surface that the light enters.

Also, one side end of the light guide plate 34, e.g., an end portion (A) of a light guide plate 34 positioned in the remotest position from the power source 32, is beveled at a predetermined angle, to allow some of the light transferred to the light guide plate 34 to enters the second polarizing plate 220 of the second LCD panel 20.

That is to say, some of the light enters the second LCD panel 20 due to the presence of the beveled end portion (A) on the end of the light guide plate 34. The light entering the second LCD panel 20 is reflected by a reflective electrode (not shown) formed on the first substrate 100 of the second LCD panel 20. As a result, the second LCD panel 20 may display the same image on both a surface (first surface) on which the first LCD panel 10 projects an image and on its opposite surface (second surface).

The housing 40 anchors the first and second LCD panels 10 and 20 and the backlight unit 30. An opening 42 is provided in the housing 40 to correspond to the second surface, e.g., an image-projected surface of the second LCD panel 20.

When the dual LCD is realized in this exemplary embodiment of the present invention as described above, the dual LCD panel may be realized using a pair of the same substrates. Therefore, the dual LCD may be desirably manufactured with a slim thickness since its dual structure may be achieved with the same thickness as conventional single-structured LCDs, and therefore, a considerable cost saving in both the material cost and processing cost may be expected.

Figure 3:
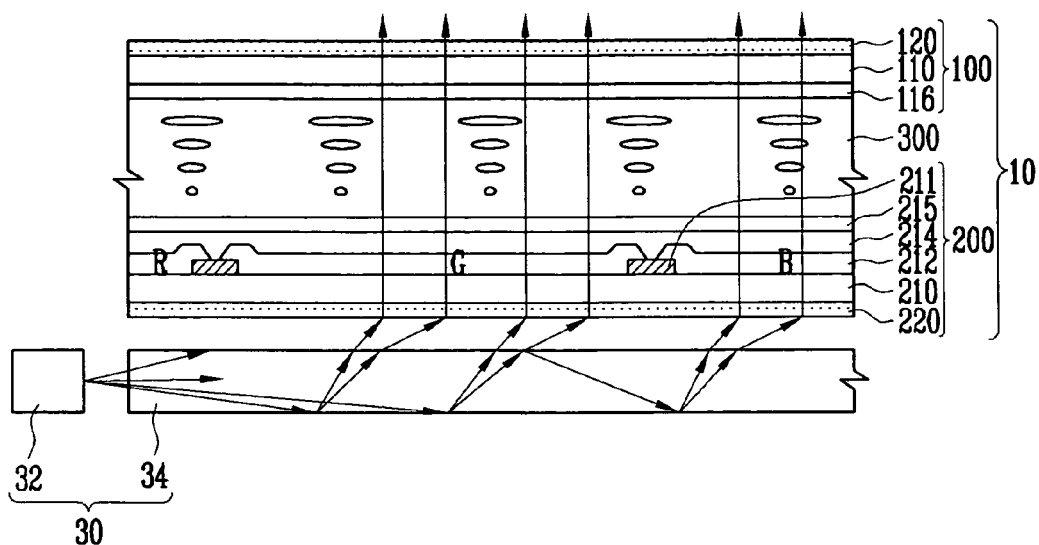
FIG. 3 is a cross-sectional view of a portion of the first LCD panel in the dual LCD of FIG. 1.
Figure 4:
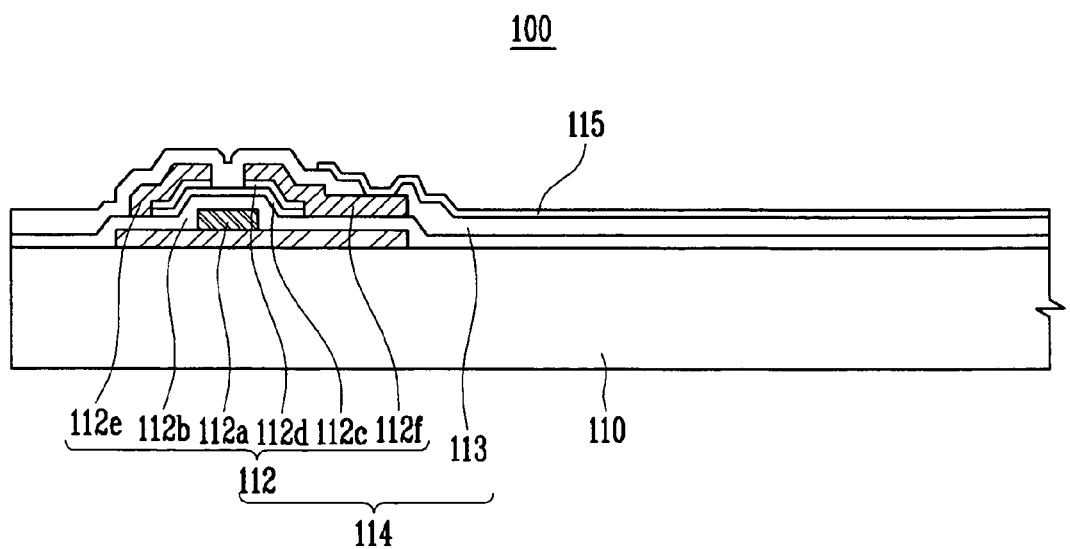
FIG. 4 is a cross-sectional view of a first substrate of FIG. 3.

FIG. 3 is a cross-sectional view of a portion corresponding to the first LCD panel in the dual LCD of FIG. 1, and FIG. 4 is a cross-sectional view of the first substrate of FIG. 3.

Referring to FIG. 3, a backlight unit 30 is arranged on the bottom of the first LCD panel 10, including a power source 32 for generating light and a light guide plate 34 for transmitting the light irradiated by the power source 32 into the first LCD panel 10.

The first LCD panel 10 is composed of a first substrate 100; a second substrate 200 spaced apart from the first substrate 100 at a predetermined distance; and a liquid crystal layer 300 interposed between the first and second substrates 100 and 200. Also, a first polarizing plate 120 and a second polarizing plate 220 are formed respectively on the top and bottom of the first LCD panel 10.

As shown in FIGS. 3 and 4, the first substrate 100 includes a transparent substrate 110; a Thin Film Transistor (hereinafter, referred to as a TFT) array 114 provided on the transparent substrate 110; and a pixel electrode 115 provided on the TFT array 114.

The TFT array 114 is composed of a TFT 112 and a first protective layer 113 for protecting the TFT 112. The TFT 112 is composed of a gate electrode 112a, a gate insulator 112b, an active layer 112c, an ohmic contact layer 112d, a source electrode 112e, and a drain electrode 112f.

The gate electrode 112a is provided to correspond to the light-shielding layer 211 formed on the transparent substrate 210 of the second substrate 200. The gate insulator 112b is formed throughout the transparent substrate 110 on which the gate electrode 112a is formed. The active layer 112c and the ohmic contact layer 112d are provided on the gate insulator 112b to correspond to the gate electrode 112a. The source electrode 112e and the drain electrode 112f are provided on the ohmic contact layer 112d to be spaced apart from each other at a predetermined distance.

Source and drain electrodes 112e and 112f as well as the gate electrode 112a are formed in a region on which the light-shielding layer 211 is formed. Therefore, the light-shielding layer 211 may prevent light entering the second substrate 200 from being reflected by the gate electrode 112a, the source electrode 112e and the drain electrode 112f.

The first protective layer 113 provided on the TFT 112 partially exposes the drain electrode 112f of the TFT 112. The pixel electrode 115 is provided on the first protective layer 113 and the exposed drain electrode 112f, and thus electrically coupled to the drain electrode 112f.

The pixel electrode 115 is composed of a transmissive electrode made of ITO or IZO.

Also, a light-shielding layer 211 and a color filter layer 212 are formed on the transparent substrate 210 of the second substrate, and a second protective layer 214 is formed on the light-shielding layer 211 and the color filter layer 212.

The color filter layer 212 is composed of red, green, and blue (R, G, and B) color filters that are spaced apart from each other at a predetermined distance. The light-shielding layer 211 is provided between the (R, G, and B) color filters, and the color producibility is improved by demarcating a region in which each of the color filters is formed. A second protective layer 214 made of a photocurable material is formed on the color filter layer 212 to protect the color filter layer 212.

A common electrode 215 is formed on the second protective layer 214. The common electrode 215 is made of a transparent conductive material and formed with a uniform thickness on the second protective layer 214.

The first LCD panel 10 as thus configured displays an image by irradiating the light having passed through the power source 32 and the light guide plate 34 toward the outside, e.g., the first surface, via the liquid crystal layer 300 and transmissive electrode 115 of the first LCD panel 10. That is to say, the first LCD panel 10 operates in a transmissive mode.

Figure 5:
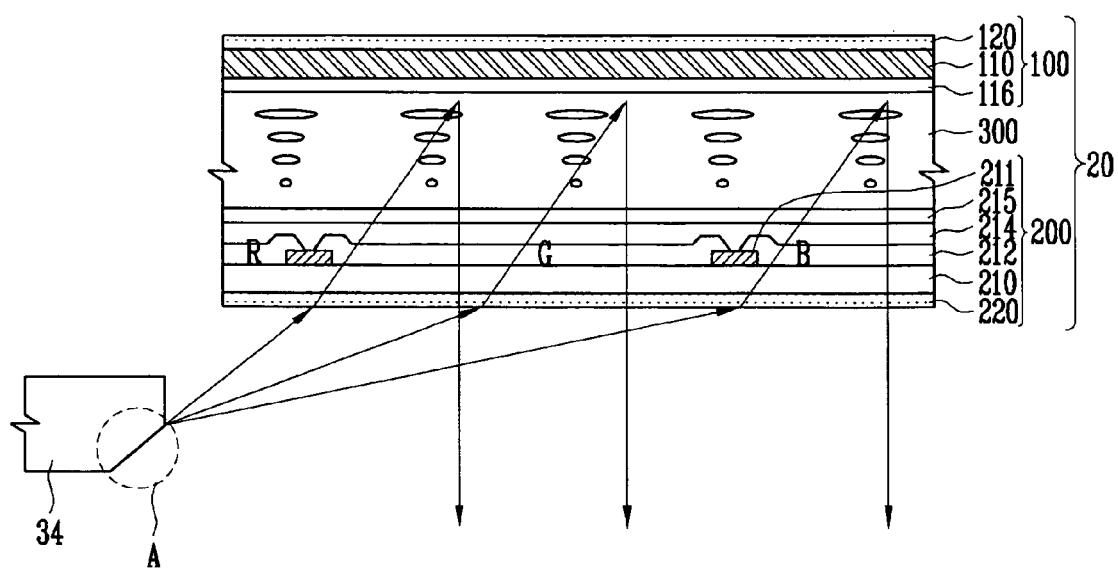
FIG. 5 is a cross-sectional view of a portion of the second LCD panel in the dual LCD of FIG. 1.
Figure 6:
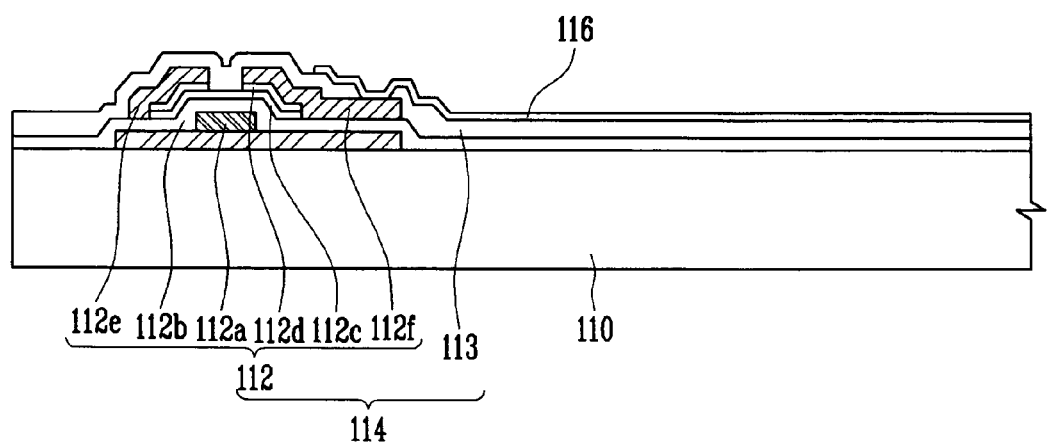
FIG. 6 is a cross-sectional view of a first substrate of FIG. 5.

FIG. 5 is a cross-sectional view of a portion corresponding to the second LCD panel of the dual LCD of FIG. 1. Lastly, FIG. 6 is a cross-sectional view of first substrate of FIG. 5.

Referring to FIG. 5, some of the light, which is delivered to the light guide plate 34 by the beveled inclined portion (A) of the light guide plate 34 provided adjacent to the bottom of the second LCD panel 20, enters the second LCD panel 20.

The second LCD panel 20 is composed of a first substrate 100; a second substrate 200 spaced apart from the first substrate 100 by a predetermined distance; and a liquid crystal layer 300 interposed between the first and second substrates 100 and 200.

The first substrate 100 and second substrate 200 are identical to those of the first LCD panel 10, as described above. The first and second LCD panels 10 and 20 according to the present exemplary embodiment of the present invention are formed in different regions (first and second regions) using a pair of the same substrates (first and second substrates).

As shown in FIGS. 5 and 6, the first substrate 100 includes a transparent substrate 110; a TFT array 114 arranged on the transparent substrate 110; and a reflective electrode 116 arranged on the TFT array 114.

The TFT array 114 is composed of a TFT 112 and a first protective layer 113 for protecting the TFT 112. The TFT 112 is composed of a gate electrode 112a, a gate insulator 112b, an active layer 112c, an ohmic contact layer 112d, a source electrode 112e, and a drain electrode 112f.

The gate electrode 112a corresponds to the light-shielding layer 211 formed on the transparent substrate 210 of the second substrate 200, and the gate insulator 112b is formed throughout the transparent substrate 110 on which the gate electrode 112a is formed. The active layer 112c and the ohmic contact layer 112d are arranged on the gate insulator 112b to correspond to the gate electrode 112a. The source electrode 112e and the drain electrode 112f are arranged on the ohmic contact layer 112d and spaced apart from each other by a predetermined distance.

Source and drain electrodes 112e and 112f as well as the gate electrode 112a are formed in a region on which the light-shielding layer 211 is formed. Therefore, the light-shielding layer 211 prevents the light entering the second substrate 200 from being reflected by the gate electrode 112a, the source electrode 112e and the drain electrode 112f.

The first protective layer 113 arranged on the TFT 112 partially exposes the drain electrode 112f of the TFT 112. The reflective electrode 116 is arranged on the first protective layer 113 and the exposed drain electrode 112f, and is electrically coupled to the drain electrode 112f.

The reflective electrode 116 is made of metals, such as aluminum-neodymium (AlNd), and is coupled to the drain electrode 112f. The reflective electrode 116 is preferably patterned in the form of plural lenses so as to enhance reflexibility of the incident light.

Also, a light-shielding layer 211 and a color filter layer 212 are formed on the transparent substrate 210 of the second substrate 200, and a second protective layer 214 is formed on the light-shielding layer 211 and the color filter layer 212.

The color filter layer 212 is composed of red, green, and blue (R, G, and B) color filters that are spaced apart from each other by a predetermined distance. The light-shielding layer 211 is provided between the (R, G, and B) color filters, and the color producibility is improved by demarcating a region in which each of the color filters is formed. A second protective layer 214, of a photocurable material, is formed on the color filter layer 212 to protect the color filter layer 212.

A common electrode 215 is formed on the second protective layer 214. The common electrode 215, of a transparent conductive material, is formed with a uniform thickness on the second protective layer 214.

Some of the light, which is delivered to the light guide plate 34 by the beveled inclined portion (A) arranged on an end portion of the light guide plate 34, enters the second LCD panel 20 as thus configured. The light entering the second LCD panel 20 penetrates the liquid crystal layer 300 of the second LCD panel 20, and then is reflected by the reflective electrode 116. As a result, an image is displayed in the second surface of the second LCD panel 20. That is to say, the second LCD panel 20 operates in a reflective mode.

When the dual LCD is realized as described above according to the present invention, the dual LCD may be desirably manufactured with a slim thickness since its dual structure may be achieved with the same thickness as conventional single-structured LCDs. Also, the dual LCD of the present invention has advantages in that considerable cost saving effects in the material cost and processing cost may be expected since the dual-structured LCD is achieved using one panel.

While the present invention has been described in connection with certain exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A dual Liquid Crystal Display (LCD), comprising: a first LCD panel and a second LCD panel arranged on a same substrate, the first LCD panel displaying an image on a first surface thereof and the second LCD panel displaying an image on a second surface thereof;
   a backlight unit arranged on a bottom of the first LCD panel; and
   a housing anchoring the first and second LCD panels and the backlight unit and having an opening on a side of the housing facing the substrate and the backlight unit and corresponding only to the image-displaying second surface of the second LCD panel,
   wherein the first LCD panel comprises a transmissive LCD panel, and the second LCD panel comprises a reflective LCD panel.

2. The dual LCD according to claim 1, wherein the first and second LCD panels are respectively arranged in different first and second regions of the same substrate.

3. The dual LCD according to claim 2, wherein a thin film transistor array and a transmissive electrode are arranged in a region corresponding to the first region of the first substrate, a thin film transistor array and a reflective electrode are arranged in a region corresponding to the second region of the first substrate, and a common electrode and a color filter pattern are respectively arranged in first and second regions of the second substrate respectively corresponding to first and second regions of the first substrate.

4. The dual LCD according to claim 2, wherein a drive circuit unit to drive the first and second LCD panels is arranged on one side of the first substrate outside of the first and second regions.

5. The dual LCD according to claim 1, wherein a first polarizing plate and a second polarizing plate are respectively arranged on tops and bottoms of the first and second LCD panels.

6. The dual LCD according to claim 1, wherein the backlight unit comprises a power source and a light guide plate, arranged on the bottom of the first LCD panel.

7. The dual LCD according to claim 6, further comprising an inclined portion arranged on one side end of the light guide plate.

8. The dual LCD according to claim 6, wherein one side end of the light guide plate comprises an end portion of a light guide plate positioned in a remotest position away from the power source.

* * * * *